United States Patent
Chen

(10) Patent No.: US 9,444,617 B2
(45) Date of Patent: Sep. 13, 2016

(54) SINGLE-WIRE TRANSMISSION INTERFACE AND SINGLE-WIRE TRANSMISSION METHOD AND POWER SUPPLY SYSTEM ADOPTING SINGLE-WIRE TRANSMISSION METHOD

(71) Applicant: Isaac Y. Chen, Zhubei (TW)

(72) Inventor: Isaac Y. Chen, Zhubei (TW)

(73) Assignee: RICHTEK TECHNOLOGY CORPORATION, Zhubei, Hsinchu ( * ) Notice: Subject to any disclaimer, the term of this patent is extended or adjusted under 35 U.S.C. 154(b) by 0 days.

(21) Appl. No.: 14/690,383

(22) Filed: Apr. 18, 2015

(65) Prior Publication Data

US 2015/0312025 A1  Oct. 29, 2015

Related U.S. Application Data

(60) Provisional application No. 61/985,862, filed on Apr. 29, 2014.

(51) Int. Cl.
| | |
|---|---|
| *H03K 7/08* | (2006.01) |
| *H04L 7/00* | (2006.01) |
| *H04L 7/04* | (2006.01) |
| *H04L 25/49* | (2006.01) |
| *H04B 3/54* | (2006.01) |

(52) U.S. Cl.
CPC ............ *H04L 7/044* (2013.01); *H04B 3/542* (2013.01); *H04L 25/4906* (2013.01)

(58) Field of Classification Search
USPC ....... 375/219, 220, 221, 222, 238, 239, 240, 375/240.26–240.28, 242, 244, 253, 254, 375/256, 257, 259, 265, 264, 284, 285, 278, 375/295, 316, 324, 325, 340, 341, 342, 353, 375/237, 346

See application file for complete search history.

(56) References Cited

U.S. PATENT DOCUMENTS

| | | | |
|---|---|---|---|
| 7,606,955 B1 * | 10/2009 | Falik | G06F 13/4295 709/230 |
| 7,672,393 B2 | 3/2010 | Chen | |
| 7,903,501 B2 * | 3/2011 | Fujisawa | G04C 9/02 368/47 |
| 8,140,726 B2 | 3/2012 | Kung et al. | |
| 8,762,763 B2 | 6/2014 | Chu et al. | |
| 2009/0237213 A1 * | 9/2009 | Ellis | A61B 5/0031 340/10.1 |
| 2010/0163631 A1 * | 7/2010 | Ishii | G06K 19/0701 235/492 |
| 2012/0139768 A1 * | 6/2012 | Loeda | H03M 5/08 341/143 |
| 2013/0120036 A1 * | 5/2013 | Zhu | H03L 7/0805 327/156 |

\* cited by examiner

*Primary Examiner* — Linda Wong
(74) *Attorney, Agent, or Firm* — Tung & Associates

(57) ABSTRACT

The present invention discloses a single-wire transmission method, which includes: providing a transmission signal including alternating high and low levels through a single-wire, wherein a period of one of the high and low levels defining a reference time and a period of the other of the high and low levels defining a content time; determining a relative relationship between the reference time and the content time; when the content time is smaller than a proportion of the reference time, defining the content time to express a first meaning; and when the content time is larger than the proportion of the reference time, defining the content time to express a second meaning.

17 Claims, 8 Drawing Sheets

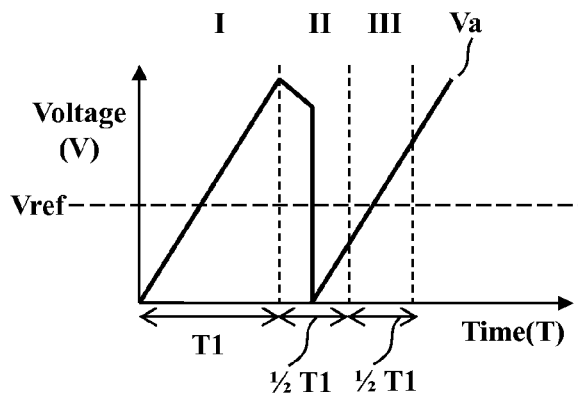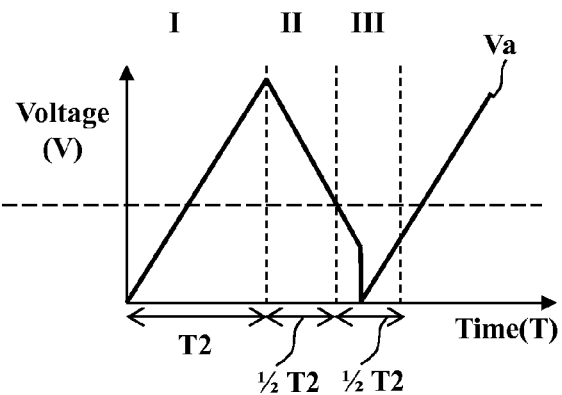
Fig. 8A    Fig. 8B
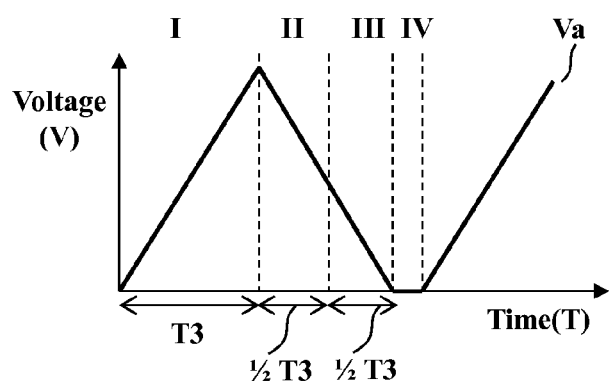
Fig. 8C

SINGLE-WIRE TRANSMISSION INTERFACE AND SINGLE-WIRE TRANSMISSION METHOD AND POWER SUPPLY SYSTEM ADOPTING SINGLE-WIRE TRANSMISSION METHOD

CROSS REFERENCE

The present invention claims priority to U.S. 61/985,862, filed on Apr. 29, 2014

BACKGROUND OF THE INVENTION

1. Field of Invention

The present invention relates to a single-wire transmission interface, a single-wire transmission method, and a power supply system adopting the single-wire transmission method; particularly, it relates to such single-wire transmission interface and single-wire transmission method applicable to a power supply cable for use in a power supply system.

2. Description of Related Art

A power supply system comprises a power converter and a power supply cable (referred as "cable" hereinafter), for supplying power to an electronic device. The cable includes positive and negative power lines (i.e., Vbus and GND) and positive and negative data lines (i.e., D+ and D−). When the power converter, the cable and the electronic device are connected in series, the positive and negative power lines are for delivering power, and the positive and negative data lines are for transmitting data between the power converter and the electronic device. However, in certain applications, one of the positive and negative data lines has to be maintained at a constant voltage level, and thus only the other one of the positive and negative data lines can be employed to transmit data. Under such circumstance, because it is unable to transmit the clock, the time length for transmitting one bit can not be defined, and the receiving side receiving the transmitted data has to decode the data without knowing the clock of the transmitting side transmitting the transmitted data.

U.S. Pat. No. 7,672,393, U.S. Pat. No. 8,140,726 and U.S. Pat. No. 8,762,763 are relevant to single-wire transmission.

In view of the above, to overcome the drawbacks in the prior art, the present invention proposes a single-wire transmission interface, a single-wire transmission method, and a power supply system adopting the single-wire transmission method, wherein single-wire transmission is achieved and the receiving side is capable of decoding the transmitted data.

SUMMARY OF THE INVENTION

From one perspective, the present invention provides a single-wire transmission method, comprising: providing a transmission signal including alternating high and low levels through a single-wire, wherein a time period of one of the high and low levels defines a reference time and a time period of the other of the high and low levels defines a content time; and determining a relative relationship between the reference time and the content time; when the content time is shorter than a first proportion of the reference time, defining the content time to express a first meaning; and when the content time is longer than the first proportion of the reference time, defining the content time to express a second meaning.

In one embodiment, the first meaning is a binary "0" and the second meaning is a binary "1", or the first meaning is a binary "1" and the second meaning is a binary "0".

In one embodiment, the single-wire transmission method further comprises: when the content time is larger than a second proportion of the reference time, defining the content time to express a third meaning.

In one embodiment, the third meaning represents a "timeout", or one digit in a base-3 or higher numeral system.

In one embodiment, the single-wire transmission method further comprises: defining an arrangement of a plurality of the first meanings and/or the second meanings to express a command combination set, wherein the plurality is a predetermined number and the command combination set includes two or more commands; and defining one of the commands as an extension command, wherein the extension command indicates to increase the predetermined number.

In one embodiment, the single-wire is a positive data line or a negative data line (D+ or D−) of a power supply cable.

From another perspective, the present invention provides a single-wire transmission interface, comprising: a decoder for receiving and decoding a transmission signal to generating a corresponding decoded signal, wherein the transmission signal includes alternating high and low levels, and wherein a time period of one of the high and low levels defines a reference time and a time period of the other of the high and low levels defines a content time; the decoder including: a first time calculation circuit for calculating the reference time to generate a reference time indication signal; a second time calculation circuit for calculating the content time to generate a content time indication signal; and a comparison circuit for comparing the reference time indication signal with the content time indication signal, to generate the decoded signal.

In one embodiment, the first time calculation circuit includes a first counter; the second time calculation circuit includes a second counter; and the comparison circuit includes a numerical comparator.

In one embodiment, the first time calculation circuit receives a first clock; the second time calculation circuit receives a second clock; and the second clock is faster than the first clock.

In one embodiment, the first time calculation circuit includes a first time-to-voltage converter, for generating a reference voltage according to the reference time; the second time calculation circuit includes a second time-to-voltage converter, for generating a content voltage according to the content time; and the comparison circuit includes a comparator, for comparing the reference voltage with the content voltage, to generate the decoded signal.

In one embodiment, the first time-to-voltage converter converts a proportion of the reference time into the reference voltage.

In one embodiment, when the content voltage is smaller than the reference voltage, the content time expresses a first meaning; and when the content voltage is larger than the reference voltage, the content time expresses a second meaning.

In one embodiment, the first time-to-voltage converter generates a plurality of reference voltages according to the reference time; and the comparison circuit compares the plurality of reference voltages with the content voltage, to generate the decoded signal.

In one embodiment, the first time-to-voltage converter includes: a first current source; a first switch coupled between the first current source and a node, wherein the first switch is controlled by the reference time; a capacitor having one end coupled to the node and having another end coupled to a ground; a second switch coupled between the node and the ground, for resetting a voltage level of the node; a peak detector coupled to the node, for outputting a peak voltage; and a divider coupled to the peak detector, for generating a proportion of the peak voltage; and the second time-to-voltage converter includes: a second current source having one end coupled to ground; a third switch coupled between the node and the second current source, wherein the third switch is controlled by the content time; the second switch; and the capacitor; wherein the first time-to-voltage converter and the second time-to-voltage converter share the second switch and the capacitor.

In one embodiment, the first time-to-voltage converter includes: a first current source; a first switch coupled between the first current source and a first node, wherein the first switch is controlled by the reference time; a first capacitor having one end coupled to the first node and having another end coupled to a ground; a second switch coupled between the first node and the ground, for resetting a voltage level of the first node; a first peak detector coupled to the first node, for outputting a first peak voltage as the reference voltage; and the second time-to-voltage converter includes: a second current source; a third switch coupled between the second current source and a second node, wherein the third switch is controlled by the content time; a second capacitor having one end coupled to the second node and having another end coupled to the ground; a fourth switch coupled between the second node and the ground, for resetting a voltage level of the second node; and a second peak detector coupled to the second node, for outputting a second peak voltage as the reference voltage.

16. The single-wire transmission interface of claim 7, the single-wire is a positive data line or a negative data line (D+ or D−) of a power supply cable.

From yet another perspective, the present invention provides a power supply system adopting the single-wire transmission method, the power supply system comprising: a power converter for converting an input voltage to an output voltage; and a cable, wherein the cable includes a power line, a grounding line and positive and negative data lines; wherein when an electronic device is coupled via the cable to the power converter, the power converter provides the output voltage to the electronic device through the cable, and wherein one of the positive and negative data lines acts as the single-wire for transmitting the transmission signal including alternating high and low levels.

The objectives, technical details, features, and effects of the present invention will be better understood with regard to the detailed description of the embodiments below, with reference to the attached drawings.

BRIEF DESCRIPTION OF THE DRAWINGS

FIGS. 8A-8C respectively show three voltage-time relationship diagrams corresponding to three definitions.

DESCRIPTION OF THE PREFERRED EMBODIMENTS

The above and other technical details, features and effects of the present invention will be will be better understood with regard to the detailed description of the embodiments below, with reference to the drawings. The drawings as referred to throughout the description of the present invention are for illustration only, to show the interrelations between the components and devices, but not drawn according to actual scale.

Figure 1:
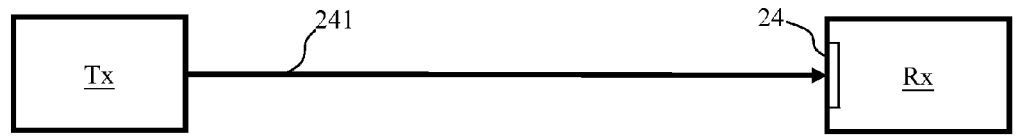
FIG. 1 shows a block diagram of a hardware configuration performing a single-wire transmission method of the present invention.

Please refer to FIG. 1, which shows a block diagram of a hardware configuration performing a single-wire transmission method of the present invention. As shown in FIG. 1, a transmitting side Tx transmits a signal ("the transmission signal") to a receiving side Rx through a single-wire 241. The receiving side Rx includes a single-wire transmission interface 24, which is capable of decoding the received signal. When the transmitting side Tx transmits the signal to the receiving side Rx, it is required to comply with a predefined transmission protocol between the transmitting side Tx and the receiving side Rx. The present invention provides a novel transmission protocol and a hardware circuit capable of decoding the transmission signal according to such novel transmission protocol.

Figure 2:
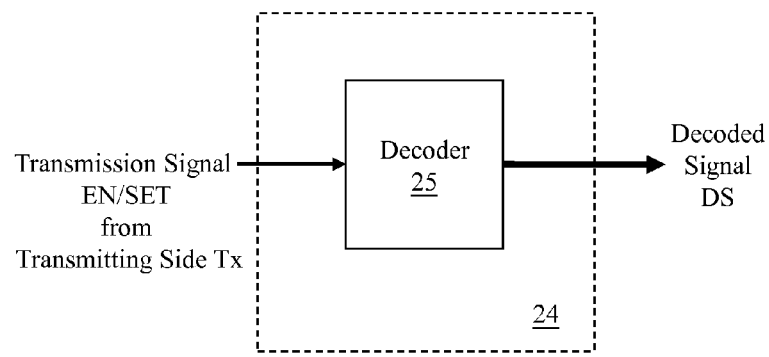
FIG. 2 shows an embodiment of the single-wire transmission interface of the present invention.

Please refer to FIG. 2, which shows an embodiment of the single-wire transmission interface of the present invention. The single-wire transmission interface 24 of this embodiment includes a decoder 25. The decoder 25 can receive and decode a transmission signal EN/SET transmitted through a single-wire 241 to the single-wire transmission interface 24 and generating a corresponding decoded signal DS.

Figure 3:
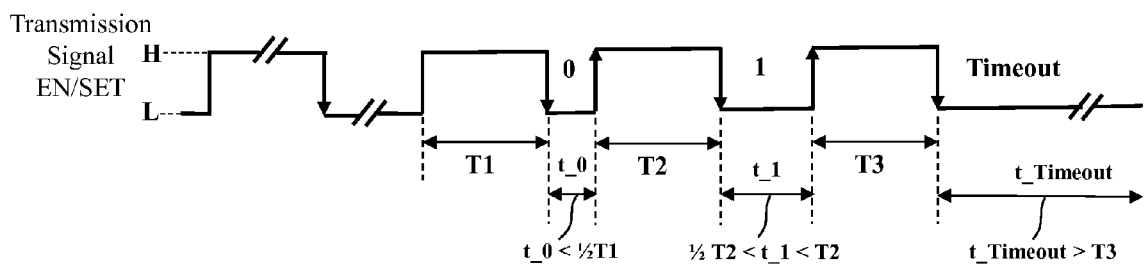
FIG. 3 shows an illustrative waveform of the transmission signal of the present invention.

Please refer to FIG. 3, which shows an illustrative wave form of the transmission signal of the present invention, to explain the single-wire transmission method of the present invention. As shown in FIGS. 1-2, the transmitting side Tx transmits the transmission signal EN/SET to the receiving side Rx through the single-wire 241. This transmission signal EN/SET includes alternating high and low levels (H/L). In the present invention, a time period of one of the high and low levels (H/L) is defined as a reference time, while a time period of the other of the high and low levels (H/L) is defined as a content time. The term "content" as described herein is the message that the transmitting side Tx intends to transmit to the receiving side Rx, which can include, for example but not limited to, commands and data. In the embodiment shown in FIG. 3, the time period of the high level (H) is defined as the reference time, while the time period of the low level (L) is defined as the content time. This arrangement is for illustrative purpose only, but not for limiting the scope of the present invention; the definitions of the high level and the low level are interchangeable.

The single-wire transmission method of the present invention can be used to transmit bits in a binary system or base-3 or higher numerical systems. This embodiment takes a binary system as an example. The time period of the high level H of the transmission signal EN/SET defines a reference time. An immediately following low level L of the transmission signal EN/SET has a time period, which is the content time. A relative relationship between the content time and its immediately preceding reference time defines whether the transmitted content is a binary "0" or "1". When the content time is shorter than a predetermined proportion of the reference time, it is defined that the content time expresses a first meaning (e.g., the binary "0"). When the content time is longer than the predetermined proportion of the reference time, it is defined that the content time expresses a second meaning (e.g., the binary "1"). Certainly, the definitions of the binary "0" and "1" are interchangeable.

Please refer to FIG. 3, in this embodiment, the above-mentioned proportion is one half (½). However, the scope of the present invention is not limited by this number. It is also practicable and within the scope of the present invention that the above-mentioned proportion can be any positive real number, smaller than, equal to, or even larger than 1. More specifically, in this embodiment:
(1) When the content time (e.g., t_0 in FIG. 3) which is the time period that transmission signal EN/SET remains at its low level L, is shorter than ½ of the reference time (e.g., T1 in FIG. 3) which is the time period that the transmission signal EN/SET remains at an immediately preceding high level H, it is defined that the content time expresses the binary "0". Namely, when a relative relationship between the content time (e.g., t_0) and the reference time (e.g., T1) meets the following equation:

$$t\_0 < (\tfrac{1}{2})T1,$$

it is defined that the content time expresses the binary "0".
(2) When the content time (e.g., t_1 in FIG. 3) is longer than ½ of the reference time (e.g., T2 in FIG. 3) but shorter than the reference time (e.g., T2 in FIG. 3), it is defined that the content time expresses the binary "1". Namely, when a relative relationship between the content time (e.g., t_1) and the reference time (e.g., T2) meets the following equation:

$$(\tfrac{1}{2})T2 < t\_1 < T2,$$

it is defined that the content time expresses the binary "1".

When the receiving side Rx already knows the length of the transmission signal EN/SET (i.e., the total number of bits of the transmission signal EN/SET), it is not required for the transmission signal EN/SET to include an end signal. In this case, after the decoder 25 has received a signal having a correct length (i.e., a transmission signal EN/SET having a correct number of bits), the decoder 25 can automatically stop receiving any more bit from the transmitting side Tx.

In another embodiment, the transmission signal EN/SET can preferably, but not necessarily, include an end signal, to accelerate the transmission speed or in case the receiving side Rx does not know the total number of bits of the transmission signal EN/SET in advance.

Please still refer to FIG. 3. When the content time (e.g., t_Timeout in FIG. 3) is longer than the reference time (e.g., T3 in FIG. 3), it is defined to mean "timeout". Namely, when a relative relationship between the content time (e.g., t_Timeout) and the reference time (T3) meets the following equation:

$$t\_Timeout > T3,$$

it is defined to mean "timeout". Thus, when the receiving side Rx receives this end signal, the decoder 25 can stop decoding.

The high level time periods T1, T2 and T3 can be the same as one another or different from one another, which is one of the advantages of the present invention. More specifically: because the clock signal upon which the transmitting side Tx operates might have certain frequency variations, and because the transmission line between the transmitting side Tx and the receiving side Rx might cause a delay which might lead to a variation of the signal length, even though the transmitting side Tx intends to generate the high level time period T1, T2 and T3 with the same time length, the actual time length received at the receiving side Rx might not be the same. However, because each bit transmitted during each content time is defined according to the time length of the immediately preceding reference time, different time lengths of the time periods T1, T2 and T3 would not hinder the present invention from generating a correct decoded signal DS. That is, the time lengths of the time periods T1, T2 and T3 are very flexible.

Note that the predetermined proportion "one half" in the above embodiment to differentiate the binary "0" and "1" is only a non-limiting example. Certainly, it is also practicable and within the scope of the present invention that the predetermined proportion can be any positive real number which is smaller than one, equal to one, or greater than one. Assuming that the time length of the reference time is fixed, to adopt a proportion having a number smaller than one is preferred, because it requires less time to transmit the content, and thus this reduces the time for transmission. By the same token, the predetermined proportion "one" to differentiate whether an end signal is being transmitted is only a non-limiting example, and it can be changed to any other value. Besides, the end signal is not necessarily longer than the length of one bit in the content (i.e., t_Timeout is not necessarily greater than t_1 or t_0).

In addition, in view of the above teaching, if more than two proportions are predetermined, the transmission signal can carry contents expressed by a higher (base-3 or above) numerical system. For example, when the content time is shorter than one third of the reference time, it is defined that the content time expresses a ternary digit "0"; when the content time is longer than one third of the reference time but shorter than two thirds of the reference time, it is defined that the content time expresses a ternary digit "1"; when the content time is longer than two thirds of the reference time but shorter than the reference time, it is defined that the content time expresses a ternary digit "2".

Figure 4:
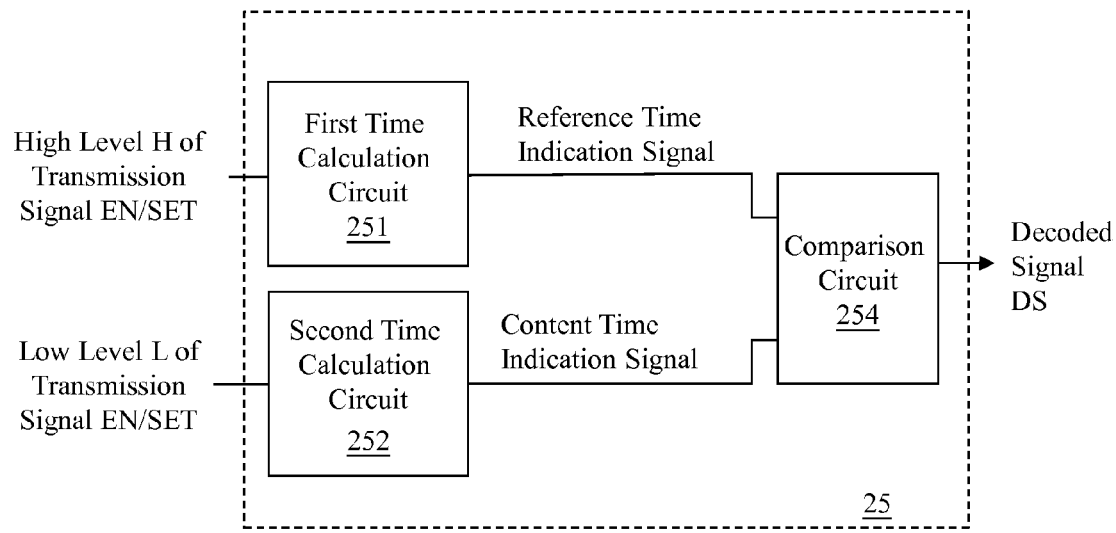
FIG. 4 shows a block diagram of an embodiment of the decoder.

Please refer to FIG. 4, which shows a block diagram of an embodiment of the decoder. The decoder 25 of this embodiment includes: a first time calculation circuit 251, a second time calculation circuit 252, and a comparison circuit 254. The first time calculation circuit 251 calculates the reference time, to generate a reference time indication signal. The second time calculation circuit 252 calculates the content time, to generate a content time indication signal. The comparison circuit 254 compares the reference time indication signal with the content time indication signal, to generate the decoded signal DS. The first time calculation circuit 251, the second time calculation circuit 252 and the comparison circuit 254 can be implemented by analog circuits or digital circuits.

Figure 5:
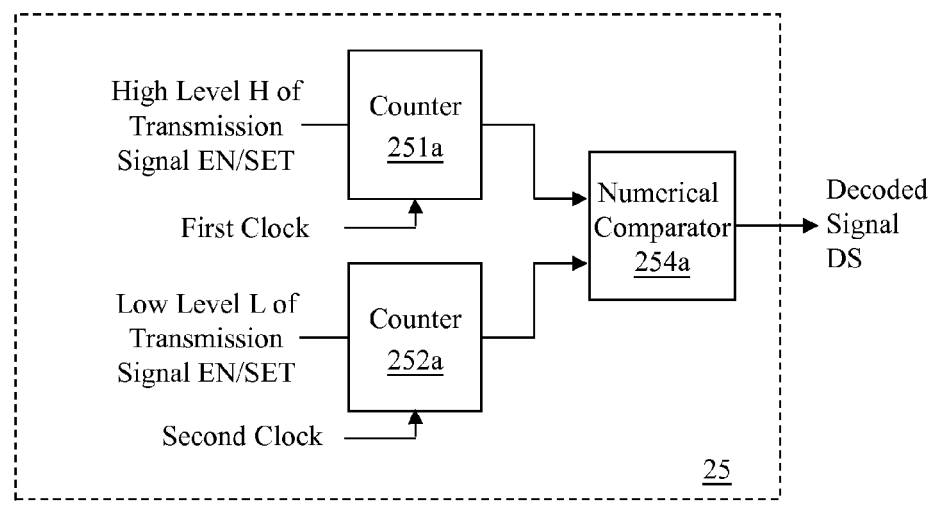
FIGS. 5-7 show several specific embodiments of the decoder.

FIG. 5 shows a more specific embodiment of the decoder. In this embodiment, the first time calculation circuit 251 is implemented as a counter 251a; the second time calculation circuit 252 is implemented as a counter 252a; and the comparison circuit 254 is implemented as a numerical comparator 254a. The counter 251a calculates a time period of the high level H (the reference time) of the transmission signal EN/SET according to a first clock. The counter 252a calculates a time period of the low level L (the content time) of the transmission signal EN/SET according to a second clock. The frequency of the first clock and the frequency of the second clock can be the same or different. If the frequency of the second clock is faster than the frequency of the first clock, it is equivalent to setting the predetermined proportion to be smaller than one. The numerical comparator 254a compares the output of the counter 251a with the output of the counter 252a, to generate the decoded signal DS.

Figure 6:
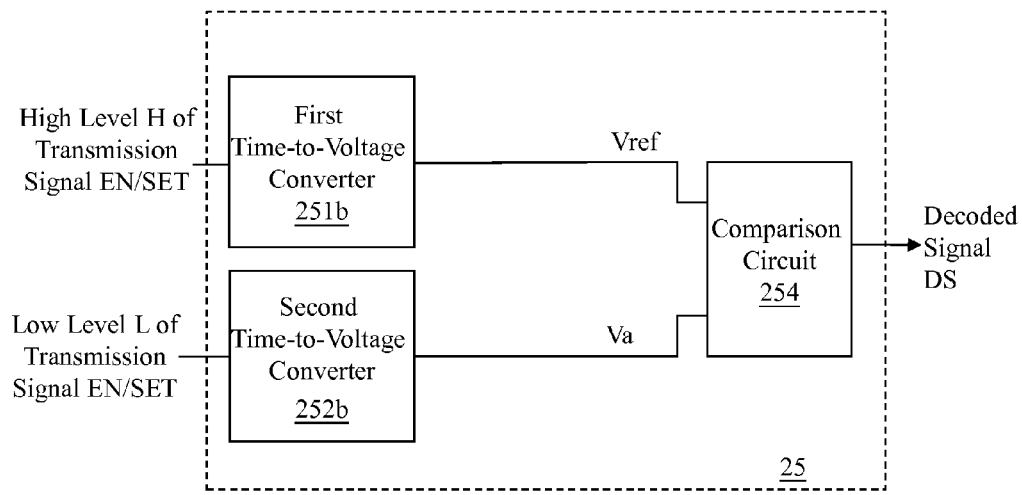

FIG. 6 shows another more specific embodiment of the decoder. In this embodiment, the first time calculation circuit 251 is implemented as a first time-to-voltage converter 251b; the second time calculation circuit 252 is implemented as a second time-to-voltage converter 252b; and the comparison circuit 254 is implemented as a comparator 254b. The embodiment converts the comparison between times into the comparison between voltages. The first time-to-voltage converter 251b generates a reference voltage Vref according to the reference time; the second time-to-voltage converter 251b generates a content voltage Va according to the content time; and the comparator 254b compares the reference voltage Vref with the content voltage Va, to generate the decoded signal DS.

Figure 7:
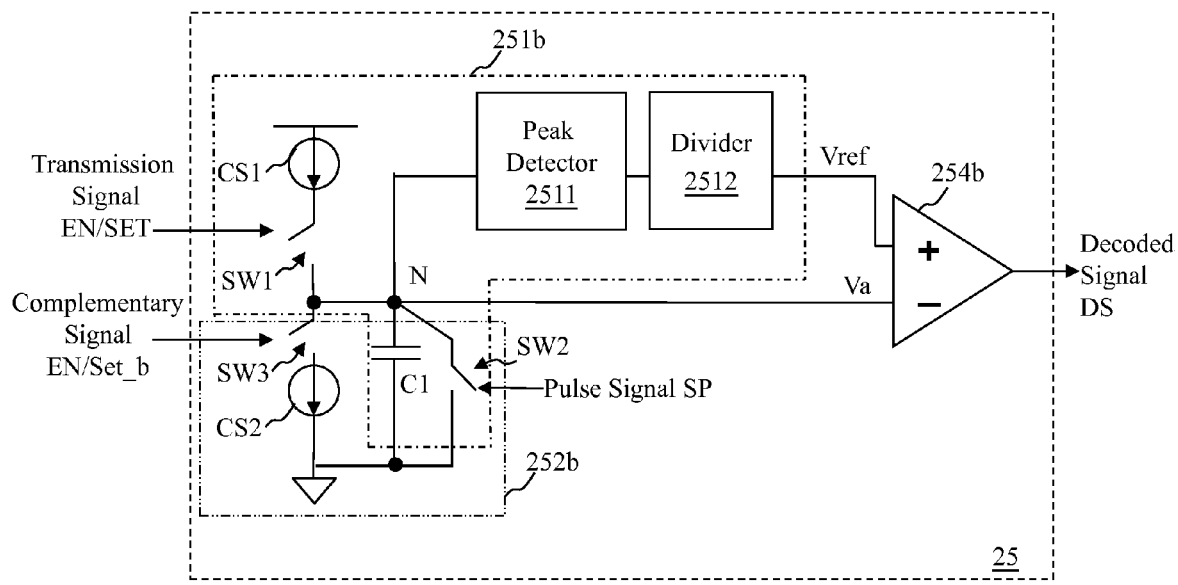

FIG. 7 shows a more specific embodiment of FIG. 6. The first time-to-voltage converter 251b includes: a current source CS1; a switch SW1 coupled between the current source CS1 and a node N, wherein the switch SW1 is controlled by a time period of the high level H (the reference time) of the transmission signal EN/SET; a capacitor C1 having one end coupled to the node N and having another end coupled to ground; a switch SW2 coupled between the node N and ground, for resetting a voltage level of the node N; a peak detector 2511 coupled to the node N, for outputting a peak voltage; and a divider 2512 coupled to the peak detector 2511, for generating a proportion of the peak voltage, which is the reference voltage Vref (note that if the proportion is "1", the divider 2512 can be omitted).

The second time-to-voltage converter 252b includes: a current source CS2 having one end coupled to ground; a switch SW3 coupled between the node N and the current source CS2, wherein the switch SW3 is controlled by a time period of the low level L (the content time) of the transmission signal EN/SET; the switch SW2; and the capacitor C1. Note that the first time-to-voltage converter 251b and the second time-to-voltage converter 252b share the same switch SW2 and the same capacitor C1.

The input terminals of the comparator 254 are coupled to the first time-to-voltage converter 251b and the second time-to-voltage converter 252b. The comparator 254 compares the reference voltage Vref with the content voltage Va, to generate the decoded signal DS.

Please refer to FIGS. 8A-8C in conjugation with FIGS. 3 and 7. FIGS. 8A-8C respectively show three voltage-time relationships corresponding to three definitions.

As shown by the stage I in FIG. 8A, when the transmission signal EN/SET remains at its high level H, the switch SW1 is ON, while the switch SW3 is controlled by a complementary signal EN/SET b of the transmission signal EN/SET and is OFF. When the switch SW1 is ON and the switch SW3 is OFF, the content voltage Va keeps increasing, to a peak voltage. The peak detector 2511 detects this peak voltage and generates a corresponding output. The divider 2512 generates a proportion of this peak voltage, which is used as the reference voltage Vref. Next, as shown by the stage II in FIG. 8A, when the transmission signal EN/SET switches to its low level L, the switch SW1 is OFF and the switch SW3 is ON, and the content voltage Va begins to drop from the peak voltage for a time period t_0 (the content time). Hence, a comparison between the content voltage Va and the reference voltage Vref shows that the content voltage Va is greater than the reference voltage Vref. After the content time is over and the comparison is completed, the switch SW2 receives a pulse signal SP and is turned ON for a short moment, to reset the voltage of the node N to a predetermined voltage level (e.g., a ground level). The voltage drops to zero (as shown by the stage II in FIG. 8A). Thereafter, the transmission signal EN/SET can start transmitting the next bit.

In this way, FIG. 8A shows a relative relationship between the content voltage Va and the reference voltage Vref as the following:

$Va > Vref$ (which corresponds to: $t\_0 < (\frac{1}{2})T1$), and it is defined that this expresses the first meaning (e.g., the binary "0").

Similarly, as shown by the stage III in FIG. 8B, the content voltage Va and the reference voltage Vref have the following relative relationship:

$0 < Va < Vref$ (which corresponds to: $(\frac{1}{2})T2 < t\_1 < T2$), and it is defined that this expresses the second meaning (e.g., the binary "1").

Similarly, as shown by the stage IV in FIG. 8C, the content voltage Va and the reference voltage Vref have the following relative relationship:

$Va = 0$ (which corresponds to: $t\_Timeout > T3$), and it is defined that this expresses "timeout".

Note that the first time-to-voltage converter 251b and the second time-to-voltage converter 252b can be implemented in various ways and is not limited to the embodiment shown in FIG. 7. For another example, please refer to FIG. 9. The first time-to-voltage converter 251b includes: a current source CS1; a first switch SW1 coupled between the current source CS1 and a first node N1, wherein the first switch sw1 is controlled by a time period of the high level H (the reference time) of the transmission signal EN/SET; a capacitor C1 having one end coupled to the first node N1 and having another end coupled to ground; a second switch SW2 coupled between the first node N1 and ground, for resetting a voltage level of the first node N1; a first peak detector 2511 coupled to the first node N1, for outputting a first peak voltage as the reference voltage Vref. The second time-to-voltage converter 252b includes: a current source CS2; a third switch SW3 coupled between the current source CS2 and a second node N2, wherein the third switch SW3 is controlled by a time period of the low level L (the content time) of the transmission signal EN/SET; a capacitor C2 having one end coupled to the second node N2 and having another end coupled to ground; a fourth switch SW4 coupled between the second node N2 and ground, for resetting a voltage level of the second node N2; and a second peak detector 2521 coupled to the second node N2, for outputting a second peak voltage as the reference voltage Va.

Figure 9:
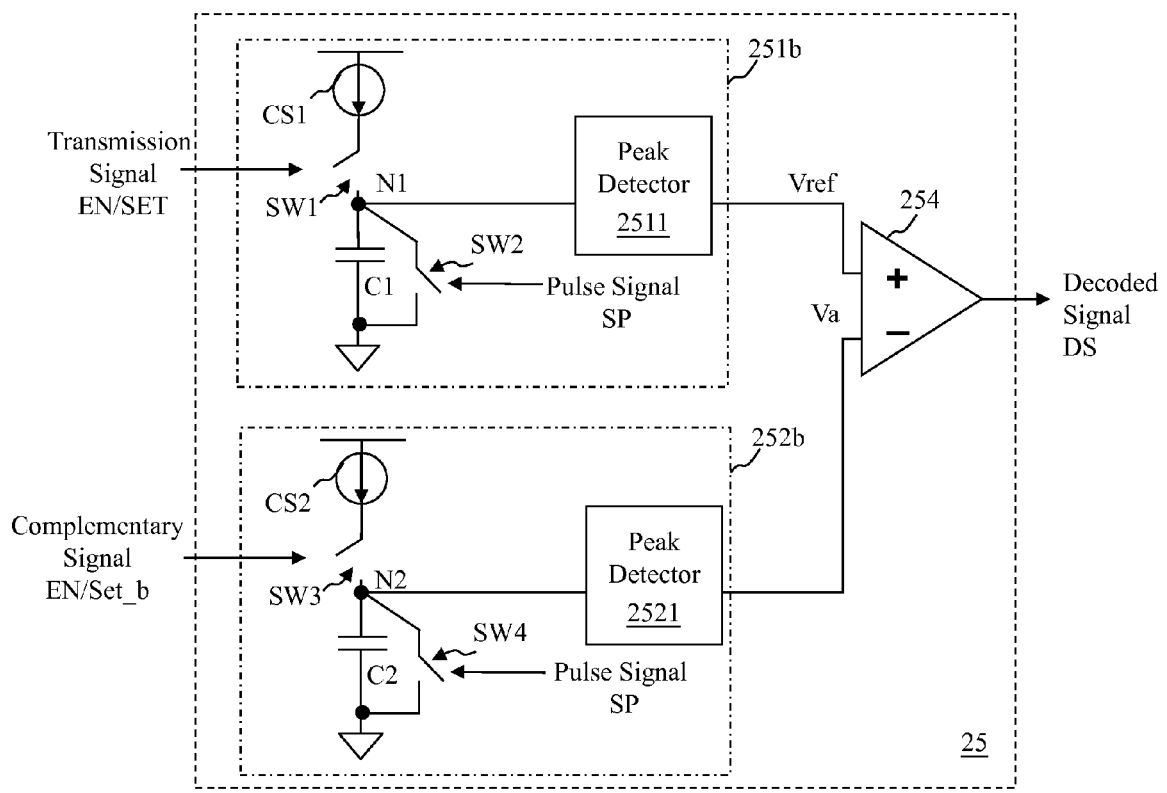
FIGS. 9-10 show two specific embodiments of the decoder.

FIG. 9 also shows that the divider in the previous embodiment is not necessarily required. First, the above-mentioned predetermined proportion can be "1"; second, even if the predetermined proportion is not "1", the same effect can be achieved by adjusting the current of the current source CS1 and/or the current of the current source CS2.

Figure 10:
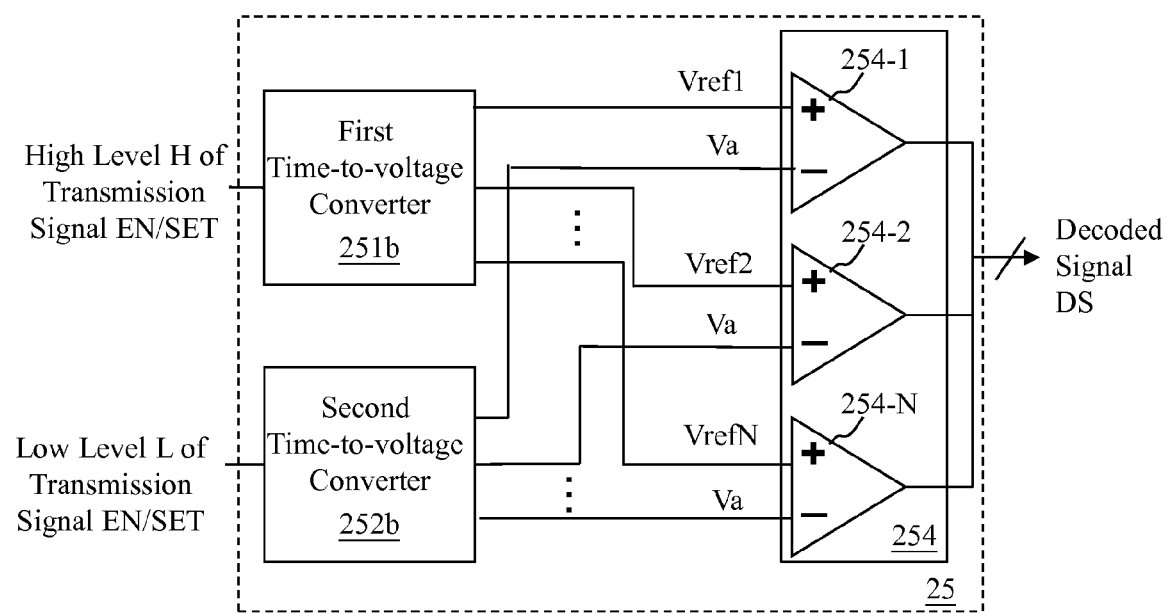

Please refer to FIG. 10. This embodiment shows that: the first time-to-voltage converter 251b can generate plural reference voltages Vref1, Vref2, . . . and VrefN, and the comparison circuit 254 can include plural comparators 254-1, 254-2, . . . and 254-N. By such configuration, the content voltage Va can be compared with plural reference voltages Vref1, Vref2 . . . and VrefN. These reference voltages Vref1, Vref2, . . . and VrefN can be, for example but not limited to, corresponding to different proportions of the above-mentioned peak voltage. As a result, the decoded signal DS can include a bit expressing a base-3 or higher digit. The above-mentioned end signal can be generated by a similar approach.

Figure 11A:
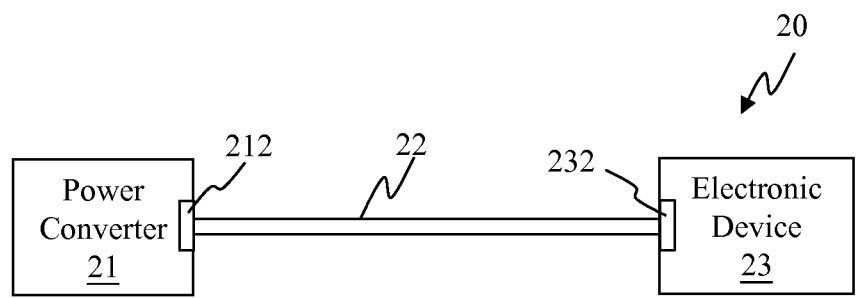
FIG. 11A shows a block diagram of a power supply system according to an embodiment of the present invention.
Figure 11B:
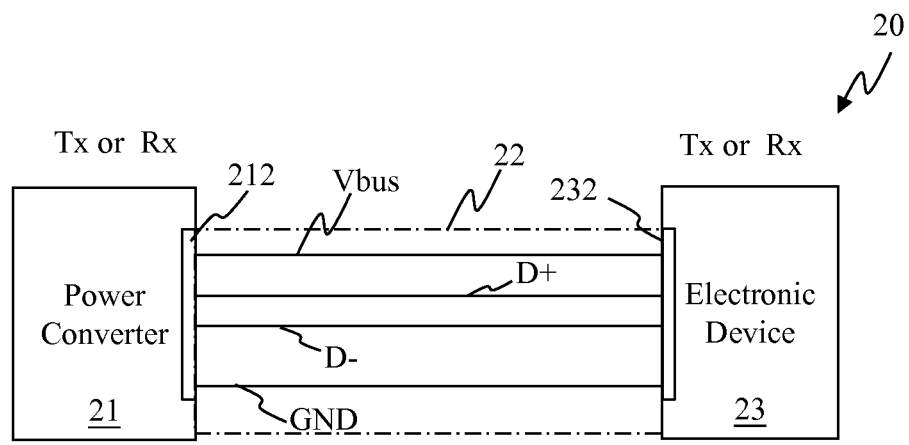
FIG. 11B shows a block diagram of a power supply system according to a more specific embodiment of the present invention.
Figure 12:
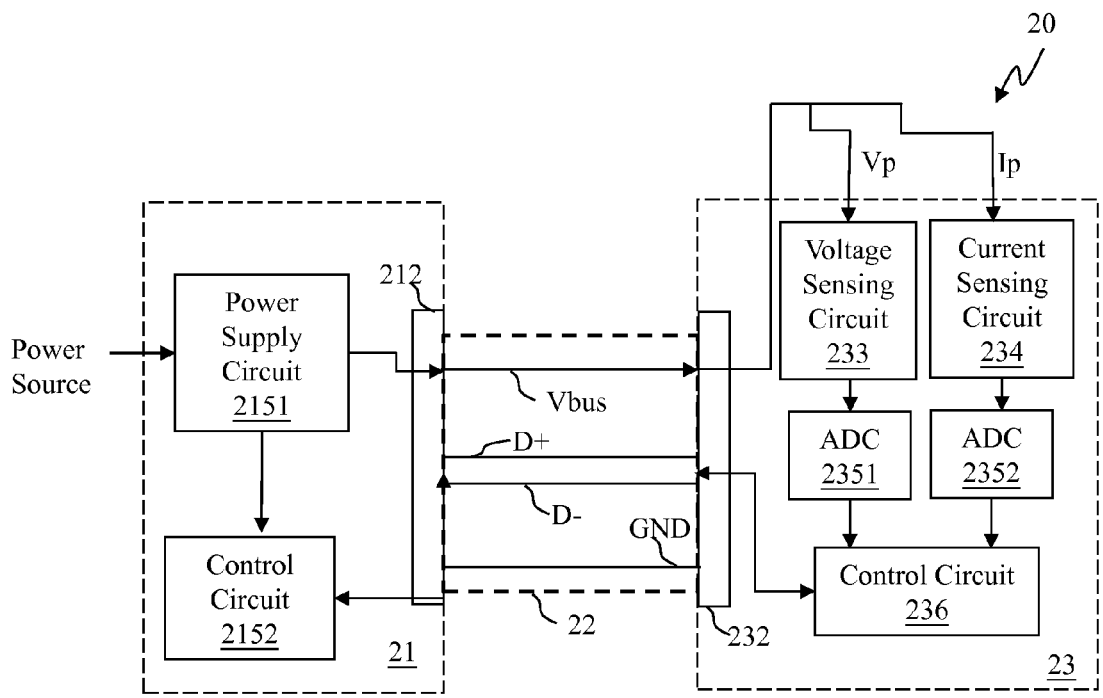
FIG. 12 shows a block diagram of a power supply system according to another more specific embodiment of the present invention.

Please refer to FIGS. 11A-11B and FIG. 12. FIG. 11A shows a block diagram of a power supply system according to an embodiment of the present invention. FIG. 11B shows a block diagram of a power supply system according to a specific embodiment of the present invention. FIG. 12 shows a block diagram of a power supply system according to another specific embodiment of the present invention. These embodiments show that the single-wire transmission method of the present invention can be applied into a power supply system.

The power supply system 20 of FIG. 11 comprises: a power converter 21 and a cable 22, for providing power to an electronic device 23. The power converter 21, the cable 22 and the electronic device 23 are connected to one another in series. The cable 22 has one end coupled to the connection port 212 of the power converter 21 and has another end coupled to the connection port 232 of the electronic device 23.

As shown in FIG. 11B, the cable 22 includes a power line Vbus, a grounding line GND, a positive data line D+ and a negative data line D−. When the power converter 21, the cable 22 and the electronic device 23 are connected to one another in series, the power line Vbus and the grounding line GND deliver power from the power converter 21 to the electronic device 23. The above-mentioned transmission signal EN/SET can be transmitted bi-directionally between the power converter 21 and the electronic device 23, through the positive line D+ or the negative line D−. Because the transmission requires only one of the positive line D+ and the negative line D−, it does not matter whether the other one of the positive line D+ and the negative line D− is required to be fixed at a constant voltage level; a bi-directional communication can still be conveniently achieved.

As shown in FIG. 12, in one embodiment, the power converter 21 includes a power supply circuit 2151 and a control circuit 2152. The electronic device 23 includes: a voltage sensing circuit 233, a current sensing circuit 234, analog-to-digital converters 2351 and 2352 and a control circuit 236. The power supply circuit 2151 receives power from an external power source (for example but not limited to public electricity), and delivers power from the power line Vbus to the electronic device 23. The voltage sensing circuit 233 senses the received voltage to generate a voltage sensing signal Vp. The current sensing circuit 234 senses the received current to generate a current sensing signal Ip. The analog-to-digital converter 2351 and the analog-to-digital converter 2352 convert the voltage sensing signal Vp and the current sensing signal Ip into corresponding digital signals, respectively, which are inputted into the control circuit 236.

For example, to shorten the charging time or to sense the power consumption of the cable 22, the control circuit 236 can, through one of the positive line D+ and the negative line D−, transmit the transmission signal EN/SET to the control circuit 2152 of the power converter 21. The content of the transmission signal EN/SET can include, for example but not limited to, a commands which instructs the power converter 21 to increase the output voltage and the output current, or, informs the power converter 21 what the actual received voltage and the actual received current are (accordingly, the power converter 21 can determine the power consumption by the cable 22). Thus, the power supply system 20 adopting the single-wire transmission method of the present invention can shorten the charging time, or check out the power consumption by the cable 22.

Figure 13:
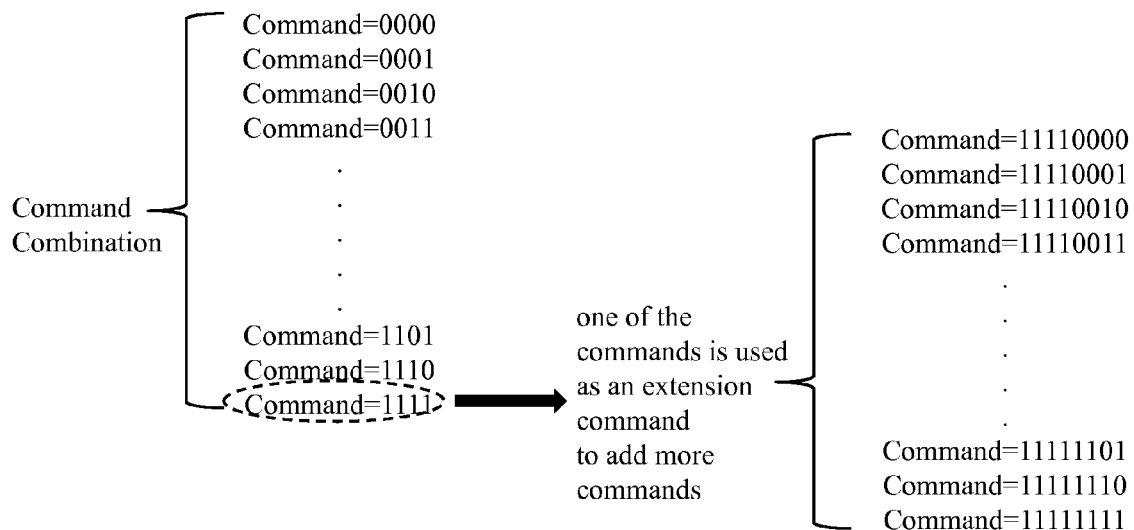
FIG. 13 explains how the present invention generates an extension command.

Please refer to FIG. 13, which explains how the present invention generates an extension command. In one embodiment, the decoded signal DS expresses a command, and the command is expressed for example but not limited by 4 binary bits. That is, there will be a command combination including a total of sixteen commands. Another feature of the present invention is that: among all the commands, one of the commands can be defined as an extension command. That is, one of the commands, for example but not limited to the command 1111, can be defined as an extension command. This extension command is a command which expresses that: new commands are to be added by more bits (for example but not limited to adding new sixteen more commands). That is, if the original setting is to encode the command with a fixed 4-bits, when it is required to define more than sixteen commands, the extension command can enlarge the number of the commands, thereby increasing the flexibility in defining commands. As compared to the case wherein the original setting is to encode the commands by a fixed 8-bits, when it is not required to define more than sixteen commands, the present invention can reduce the number of bits to be transmitted, thus speeding up the transmission time.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, the meanings of the high level and the low level of a digital signal are interchangeable, with corresponding amendments of the circuits processing these signals. For another example, a device or a circuit which does not substantially influence the primary function of a signal can be inserted between any two devices or any two circuits in the shown embodiments, such as a switch. For yet another example, the cable 22 and the power converter 21 can be integrated into a single device; or, the cable 22 and the electronic device 23 can be integrated into a single device, and the method and the interface of the present invention can still be applied. In view of the foregoing, the spirit of the present invention should cover all such and other modifications and variations, which should be interpreted to fall within the scope of the following claims and their equivalents.

What is claimed is:

1. A single-wire transmission method, comprising:
providing a transmission signal including alternating high and low levels through a single-wire, wherein:

(1) a time period of the high level defines a reference time and a time period of the low level defines a content time; or
(2) a time period of the low level defines a reference time and a time period of the high level defines a content time; and
determining a relative relationship between the reference time and the content time which immediately follows the reference time by comparing the reference time and content time;
when the determined relative relationship determines the content time is shorter than a first proportion of the reference time, defining the content time to express a first meaning; and
when the determined relative relationship determines the content time is longer than the first proportion of the reference time, defining the content time to express a second meaning.

2. The single-wire transmission method of claim 1, wherein the first meaning is a binary "0" and the second meaning is a binary "1", or the first meaning is a binary "1" and the second meaning is a binary "0".

3. The single-wire transmission method of claim 1, further comprising: when the determined relative relationship determines the content time is larger than a second proportion of the reference time, defining the content time to express a third meaning.

4. The single-wire transmission method of claim 3, wherein the third meaning represents a "timeout", or one digit in a base-3 or higher numeral system.

5. The single-wire transmission method of claim 1, further comprising:
defining an arrangement of a plurality of the first meanings and/or the second meanings to express a command combination set, wherein the plurality is a predetermined number and the command combination set includes two or more commands; and
defining one of the commands as an extension command, wherein the extension command indicates to increase the predetermined number.

6. The single-wire transmission method of claim 1, wherein the single-wire is a positive data line or a negative data line (D+ or D−) of a power supply cable.

7. A single-wire transmission interface, comprising:
a decoder for receiving and decoding a transmission signal to generating a corresponding decoded signal, wherein the transmission signal includes alternating high and low levels, and wherein a time period of one of the high and low levels defines a reference time and a time period of the other of the high and low levels defines a content time; the decoder including:
a first time calculation circuit for calculating the reference time to generate a reference time indication signal;
a second time calculation circuit for calculating the content time to generate a content time indication signal; and
a comparison circuit for comparing the reference time indication signal with the content time indication signal, to generate the decoded signal.

8. The single-wire transmission interface of claim 7, wherein:
the first time calculation circuit includes a first counter;
the second time calculation circuit includes a second counter; and
the comparison circuit includes a numerical comparator.

9. The single-wire transmission interface of claim 8, wherein:

the first time calculation circuit receives a first clock;
the second time calculation circuit receives a second clock; and
the second clock is faster than the first clock.

10. The single-wire transmission interface of claim 7, wherein:
the first time calculation circuit includes a first time-to-voltage converter, for generating a reference voltage according to the reference time;
the second time calculation circuit includes a second time-to-voltage converter, for generating a content voltage according to the content time; and
the comparison circuit includes a comparator, for comparing the reference voltage with the content voltage, to generate the decoded signal.

11. The single-wire transmission interface of claim 10, wherein the first time-to-voltage converter converts a proportion of the reference time into the reference voltage.

12. The single-wire transmission interface of claim 10, wherein:
when the comparison circuit determines the content voltage is smaller than the reference voltage, the content time expresses a first meaning; and
when the comparison circuit determines the content voltage is larger than the reference voltage, the content time expresses a second meaning.

13. The single-wire transmission interface of claim 10, wherein:
the first time-to-voltage converter generates a plurality of reference voltages according to the reference time; and
the comparison circuit compares the plurality of reference voltages with the content voltage, to generate the decoded signal.

14. The single-wire transmission interface of claim 10, wherein:
the first time-to-voltage converter includes:
a first current source;
a first switch coupled between the first current source and a node, wherein the first switch is controlled by the reference time;
a capacitor having one end coupled to the node and having another end coupled to a ground;
a second switch coupled between the node and the ground, for resetting a voltage level of the node;
a peak detector coupled to the node, for outputting a peak voltage; and
a divider coupled to the peak detector, for generating a proportion of the peak voltage; and
the second time-to-voltage converter includes:
a second current source having one end coupled to ground;
a third switch coupled between the node and the second current source, wherein the third switch is controlled by the content time;
the second switch; and
the capacitor;
wherein the first time-to-voltage converter and the second time-to-voltage converter share the second switch and the capacitor.

15. The single-wire transmission interface of claim 10, wherein:
the first time-to-voltage converter includes:
a first current source;
a first switch coupled between the first current source and a first node, wherein the first switch is controlled by the reference time;

a first capacitor having one end coupled to the first node and having another end coupled to a ground;

a second switch coupled between the first node and the ground, for resetting a voltage level of the first node;

a first peak detector coupled to the first node, for outputting a first peak voltage as the reference voltage; and the second time-to-voltage converter includes:

a second current source;

a third switch coupled between the second current source and a second node, wherein the third switch is controlled by the content time;

a second capacitor having one end coupled to the second node and having another end coupled to the ground;

a fourth switch coupled between the second node and the ground, for resetting a voltage level of the second node; and a second peak detector coupled to the second node, for outputting a second peak voltage as the reference voltage.

16. The single-wire transmission interface of claim 7, wherein the single-wire is a positive data line or a negative data line (D+ or D−) of a power supply cable.

17. A power supply system comprising:

a power converter for converting an input voltage to an output voltage;

a cable, wherein the cable includes a power line, a grounding line and positive and negative data lines, wherein one of the positive and negative data lines acts as a single-wire for transmitting a transmission signal including alternating high and low levels; and a controller for controlling the transmission of the transmission signal or decoding the transmission signal;

wherein when an electronic device is coupled via the cable to the power converter, the power converter provides the output voltage to the electronic device through the cable; and wherein, in the transmission signal:

(1) a time period of the high level defines a reference time and a time period of the low level defines a content time; or (2) a time period of the low level defines a reference time and a time period of the high level defines a content time; and wherein the controller decodes or controls the transmission of the transmission signal further comprises determine a relative relationship between the reference time and the content time which immediately follows the reference time defines meanings of the transmission signal by comparing the content time to the reference time to determine:

(1) when the content time is shorter than a first proportion of the reference time, the content time is defined to express a first meaning; and (2) when the content time is longer than the first proportion of the reference time, the content time is defined to express a second meaning.

* * * * *